(12) United States Patent
Bansode et al.

(10) Patent No.: US 9,098,538 B2
(45) Date of Patent: Aug. 4, 2015

(54) MASTER DATA MANAGEMENT VERSIONING

(75) Inventors: Neelesh V. Bansode, Bangalore (IN); Thomas K. Ryan, Valley Center, CA (US); Latesh Pant, Bangalore (IN); Vivek Shandilya, Bangalore (IN); Nitin Pratap Jain, Bangalore (IN); Shashank Shekhar, Patna (IN)

(73) Assignee: Teradata US, Inc., Dayton, OH (US)

( * ) Notice: Subject to any disclaimer, the term of this patent is extended or adjusted under 35 U.S.C. 154(b) by 141 days.

(21) Appl. No.: 13/250,740

(22) Filed: Sep. 30, 2011

(65) Prior Publication Data

US 2012/0084257 A1  Apr. 5, 2012

Related U.S. Application Data

(60) Provisional application No. 61/388,387, filed on Sep. 30, 2010.

(51) Int. Cl.
  *G06F 17/30* (2006.01)
(52) U.S. Cl.
  CPC .... *G06F 17/30309* (2013.01); *G06F 17/30356* (2013.01); *G06F 17/30383* (2013.01)
(58) Field of Classification Search
  CPC .................................................. G06F 17/30309
  USPC ................ 707/638, 792, 999.1, 999.203, 610
  See application file for complete search history.

(56) References Cited

U.S. PATENT DOCUMENTS

| | | | | |
|---|---|---|---|---|
| 6,192,373 B1* | 2/2001 | Haegele | ................................ | 1/1 |
| 7,246,128 B2* | 7/2007 | Jordahl | ................................ | 1/1 |
| 7,836,028 B1* | 11/2010 | Agarwal et al. | ............... | 707/695 |
| 8,260,824 B2* | 9/2012 | Mao et al. | ...................... | 707/803 |
| 8,335,215 B2* | 12/2012 | Fischer | ......................... | 370/392 |
| 8,356,009 B2* | 1/2013 | Ellard et al. | .................. | 707/620 |
| 8,387,069 B2* | 2/2013 | Yin et al. | ...................... | 719/316 |
| 8,402,361 B2* | 3/2013 | Goldberg | ...................... | 715/212 |
| 8,417,739 B2* | 4/2013 | Williamson | .................. | 707/804 |
| 2002/0059003 A1* | 5/2002 | Ruth et al. | ...................... | 700/19 |
| 2003/0055822 A1* | 3/2003 | Yu | ..................................... | 707/6 |
| 2004/0059611 A1* | 3/2004 | Kananghinis et al. | ............ | 705/7 |
| 2005/0033726 A1* | 2/2005 | Wu et al. | ........................... | 707/1 |
| 2005/0138160 A1* | 6/2005 | Klein et al. | .................... | 709/223 |
| 2006/0026124 A1* | 2/2006 | Schwarzmann | ................. | 707/2 |
| 2006/0064666 A1* | 3/2006 | Amaru et al. | ................. | 717/100 |
| 2006/0117057 A1* | 6/2006 | Legault et al. | ................ | 707/102 |
| 2007/0276858 A1* | 11/2007 | Cushman et al. | ............ | 707/102 |
| 2009/0193051 A1* | 7/2009 | Ueda et al. | ..................... | 707/102 |
| 2011/0004633 A1* | 1/2011 | Kantorova et al. | ............ | 707/802 |
| 2012/0059863 A1* | 3/2012 | Thomson et al. | ............ | 707/805 |
| 2012/0240193 A1* | 9/2012 | Littlefield et al. | ................ | 726/4 |

* cited by examiner

*Primary Examiner* — Miranda Le
(74) *Attorney, Agent, or Firm* — Gates & Cooper LLP

(57) ABSTRACT

A method, system, apparatus, and article of manufacture provide the ability to maintain multiple versions of structured views of data in a computer system. A relational database management system (RDBMS) is executed that stores master data in the computer system in master RDBMS tables. The master data is hierarchical in nature and hierarchy metadata for the master data is stored in the RDBMS tables. As part of a process and framework, a series of business rules and process workflows are maintained to manage the master data. Version tables are created in the RDBMS that correspond to each of the master RDBMS tables. Each of the version tables includes an attribute denoting version information. Versions of the master data are defined by replicating the master data and hierarchy metadata into the corresponding version tables. The version tables are used to graphically visualize, manage, and manipulate the versions of the master data.

12 Claims, 7 Drawing Sheets

MASTER DATA MANAGEMENT VERSIONING

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/388,387, filed Sep. 30, 2010, by Neelesh V. Bansode, Thomas K. Ryan, Latesh Pant, Vivek Shandilya, Nitin Pratap Jain and Shashank Shekhar, entitled "Master Data Management Versioning."

This application is related to the following co-pending and commonly-assigned patent application, which application is incorporated by reference herein:

U.S. patent application Ser. No. 12/574,509, entitled "HIERARCHY MANAGER FOR MASTER DATA MANAGEMENT", by Brian J. Wasserman, Thomas K. Ryan, Carl L. Christofferson, Neelesh V. Bansode, Santosh Kumar Singh, Madhavi Chandrashekar, and Vivek Shandilya, filed on Oct. 6, 2009, which application claims priority to Provisional Application Ser. No. 61/195,321, filed Oct. 6, 2008, Brian J. Wasserman, Thomas K. Ryan, Carl Christofferson, Neelesh V. Bansode, Santosh Kumar Singh, Madhavi Chandrashekar, and Vivek Shandilya, entitled "Hierarchy Manager for Master Data Management."

BACKGROUND OF THE INVENTION

1. Field of the Invention

This invention relates in general to managing business critical data in a computer, and in particular, to managing different versions of such data.

2. Description of Related Art

Master Data Management™ (MDM) (also known as an MDM application), available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

A common requirement for customers in a Master Data Management™ context is the ability to manage master data across different versions of that data. Specifically, users desire to manage "versions" of hierarchies that contain master data records and master data relationships. Such problems may be better understood with a more detailed explanation of master data and master data relationships.

Core to the management of master data is the definition of a data model. The data model serves as the foundation for all business rules and workflow processes within the Master Data Management™ (MDM) framework. The data model represents the form the master data must ultimately take in the customer's data warehouse to be used by the consuming business applications.

A significant portion of the business critical master data consists of "data relationship" data itself. Relationship data is the data required to manage the association of one piece of data (typically a data entity or table) to another. The Data Relationship can take the form of a hierarchy or a direct reference or any other association. Management of the relationship or association requires data and business processes that are key to the concept of Master Data Relationship Management.

Different versions of both the master data and relationship data may exist in various hierarchies across multiple users. Accordingly, it is desirable to manage and manipulate such different versions.

SUMMARY OF THE INVENTION

One or more embodiments of the invention provide techniques to manage and to manipulate versions of hierarchies and hierarchical data. The master data and the relationship data reside in a series of MDM™ tables that are part of the core of Master Data Management™. Management and manipulation of relationship data are provided within MD™ in the form of user interfaces, hierarchies, and business workflows capabilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

One or more embodiments of the invention provide techniques and capabilities for managing and manipulating different versions of hierarchies and hierarchical data.

Hardware and Software Environment Overview

Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ (MDM) framework.

The system of record can take many forms. Many users build a central database (e.g. a data warehouse or operational data store) as a hub through which master data, metadata, and physical data are synchronized. Some hubs are simply master files or tables that collect and collate records.

Regardless of the technology approach, embodiments of the invention provide the ability to deploy a system on any designated target system for testing or production.

Figure 1:
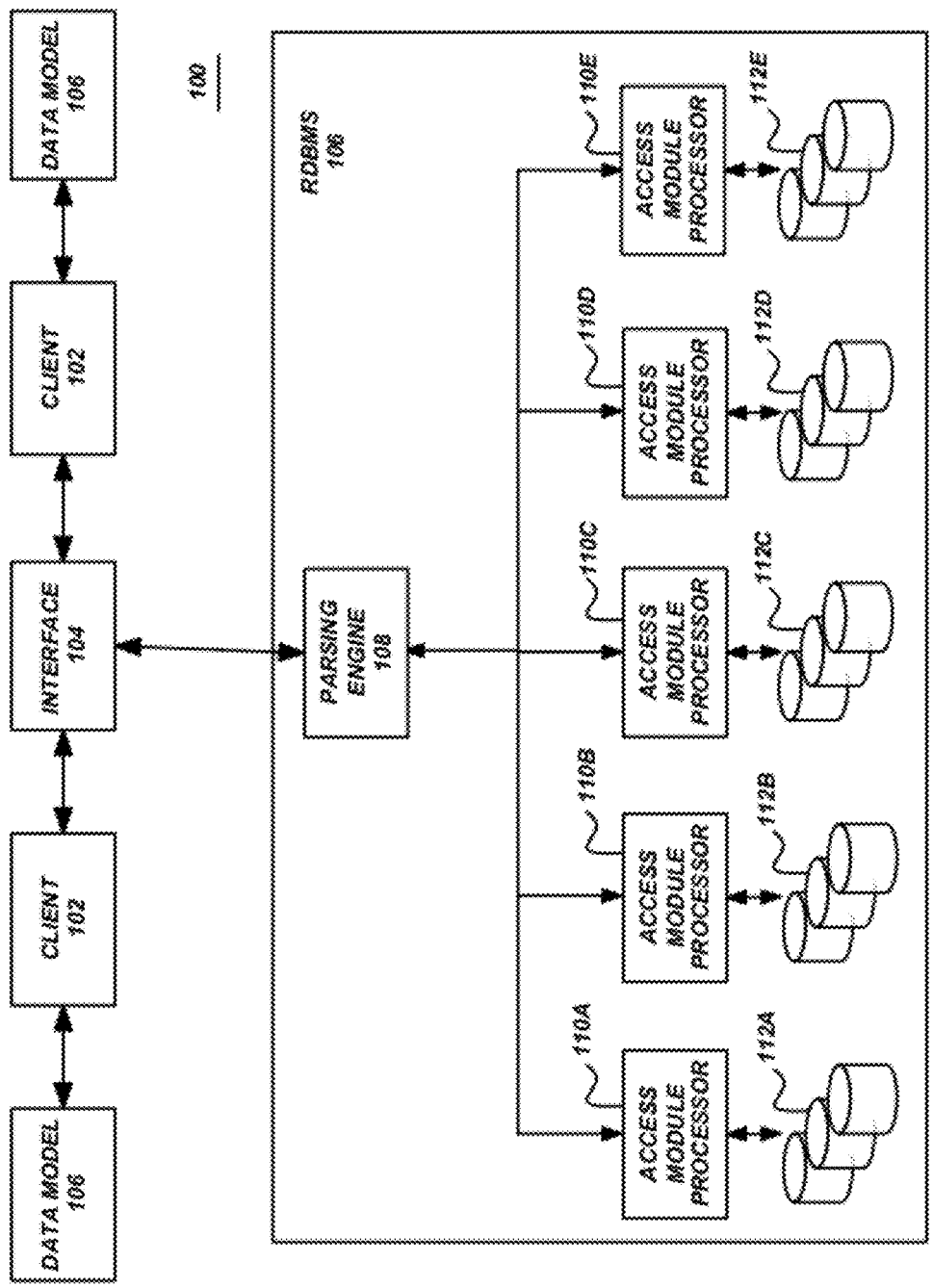
FIG. 1 illustrates an exemplary hardware and software environment according to one or more embodiments of the present invention.

FIG. 1 illustrates an exemplary hardware and software environment according to one or more embodiments of the present invention. In the exemplary environment, a computer system 100 implements an improved MDM framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In one or more embodiments, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in one or more embodiments, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Hardware and Software Environment Details

As described above with respect to FIG. 1, the master data is stored in RDBMS 106 and is accessed by clients 102 via interface 104. Such client 102 access through interface 104 is enabled by MDM sanctioned data processes referred to as workflows (e.g., provided in interface 104). Rather than being provided via interface 104, such workflows may be provided as part of parsing engine 108 or be provided by the AMPs 110 (or other parts of RDBMS 106). Consumer applications and processes may execute on clients 102 and may need to receive data from the RDBMS 106.

Further, as described above, it is desirable to manage master data across different versions of the data. In this regard, it is desirable to manage versions of hierarchies that contain master data records and master data relationships. To enable such versioning management and to achieve accurate decision making, hierarchy master data and its associated relationship data must be consistent and accurate. With the capability of providing various "what-if" scenarios of future verses present data relationship analysis, via "versioning", embodiments of the invention provide a distinct advantage to the decision makers of the organization.

Figure 2:
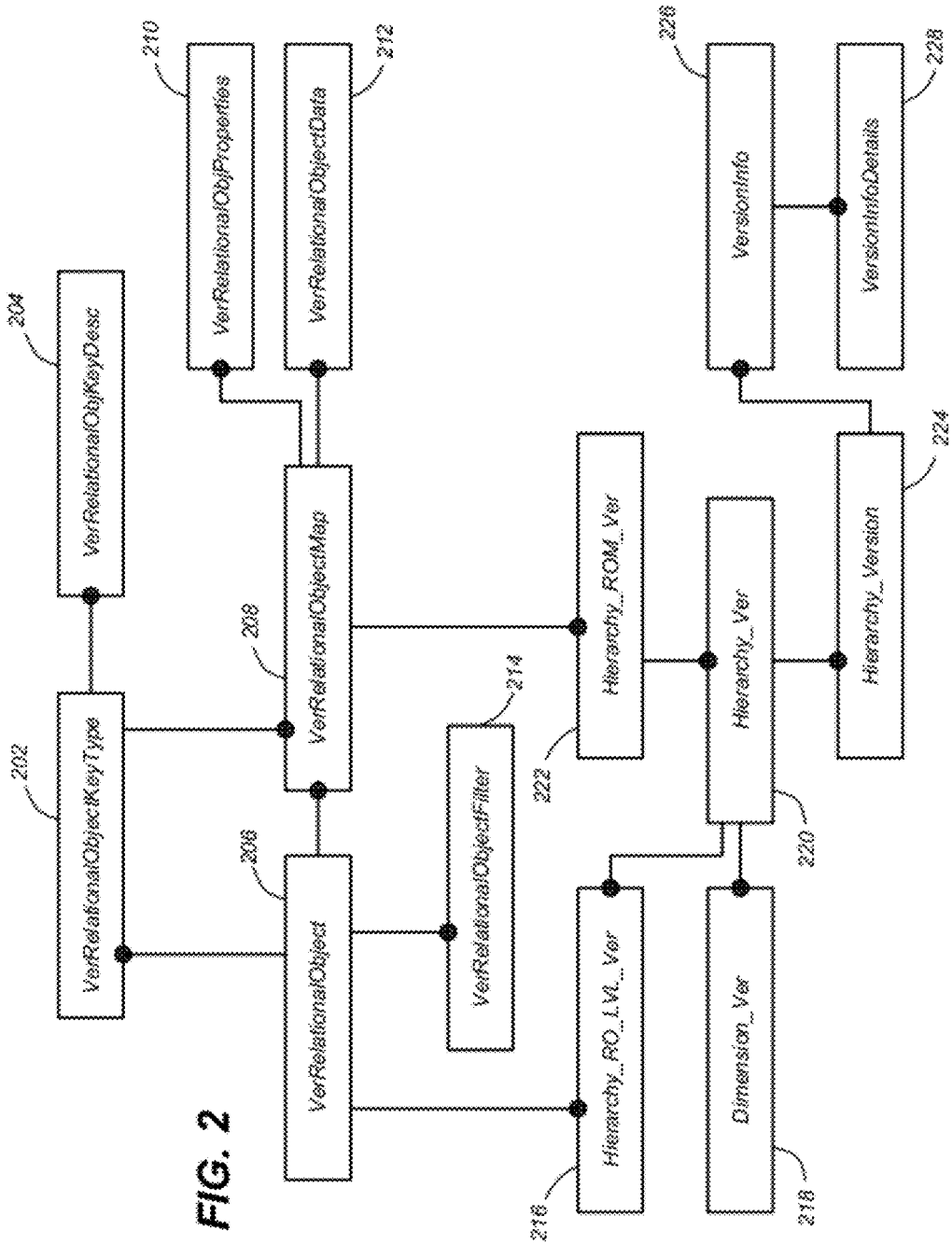
FIG. 2 illustrates a data model used to assist in visualizing a hierarchy version in accordance with one or more embodiments of the invention.

Within MDM, a 'Version' is an exact copy of the master data and all of its associated master data relationships tied together via a version-ID. A newly formed 'Version' can remain as the original, or modifications can be made to it (or any of its data contents), for comparisons, analysis and/or reporting. The data model illustrated in FIG. 2 can assist in visualizing a hierarchy version in accordance with one or more embodiments of the invention. The data model of FIG. 2 can also be viewed as a version extension to the master data relationship management (MDRM) data model. A detailed description of FIG. 2 is below.

Embodiments of the invention directly integrate the management and visualization of hierarchical data with master data management. This allows for customers to view, visualize, and interact with data in a hierarchical version, while allowing this data to remain under the control of the MDM framework.

One desirable element in a design of embodiments of the invention is to create additional placeholder data structures and tables for the version metadata and data itself. Accordingly, a new staging area named "Version" may be added (to the existing data model) for replicating the master data. Each master table has one corresponding version table. Also the version table may have an additional attribute denoting the version information and effectively forming the part of the primary key in the version tables. The version table may follow the standard naming conventions as per MDM staging areas.

Versioned staging tables are designed to utilize partitioning concept (PPI) to optimize the retrieval and deletion of version data, as the data is always fetched/analyzed with respect to a particular partition at a time, hence, a version id is chosen to be the partition column, providing the benefits of dynamic partition elimination (DPE) at the run time.

An exemplary scenario is that of a geography hierarchy consisting of Country, State and City data. For simplicity, assume that these three data elements are master tables within the MDM context. These tables would also be the Relationship Objects (ROs) in the MDM Hierarchy Management context. The RO creation sub-module needs to be enhanced to capture the version related information by adhering to the above design principles.

There may be a need to take a version of this geography hierarchy for an analysis/comparison purpose. The versioning process would copy the hierarchy metadata and the actual master data into the corresponding Version tables.

All of this information (master data as well as metadata) is stored in physically separate staging/meta tables. Accordingly, the versioned data will have the proviso to undergo edits for "what-if" types of analysis or can be specified as "read-only" versions for historical or time dependent analysis and can be accessed in the same way as other hierarchies would be accessed from hierarchy a manager/viewer. Additionally, each of these hierarchies can undergo multiple versions.

All other sub features of hierarchy manager/viewer, e.g., search and drag and drop, including the support for database views, may also be enhanced to support the versioned hierarchy.

Hierarchy Manager Architecture

As described above, a hierarchy is a set of business data that can be organized into a hierarchical structure. In master data management (MDM), a hierarchy is constructed from the data already contained in a database (e.g., a Teradata™ database available from the assignee of the present invention). This means that the member data contained in the fact tables that comprise a hierarchy is already under management of various MDM workflows and business processes.

The hierarchy manager feature of MDM allows users with proper authorization to create and modify the structural composition of a hierarchy. This hierarchy structure can then be used to drive a hierarchy viewer and any reporting processes. The hierarchy manager and viewer are integrated directly into the Master Data Management Framework (described above).

Its hierarchy viewer (and manager)'s primary responsibilities are to allow users to visualize the data in a hierarchical fashion. Users can also interact directly with this data, to access detailed information about specific data elements, or to manipulate the data in a way that modifies the hierarchical relationships of the data.

In view of the above, various implementations of the invention may provide the ability to create a hierarchy and then launch a viewer to view the hierarchy and edit the hierarchy data.

Figure 3:
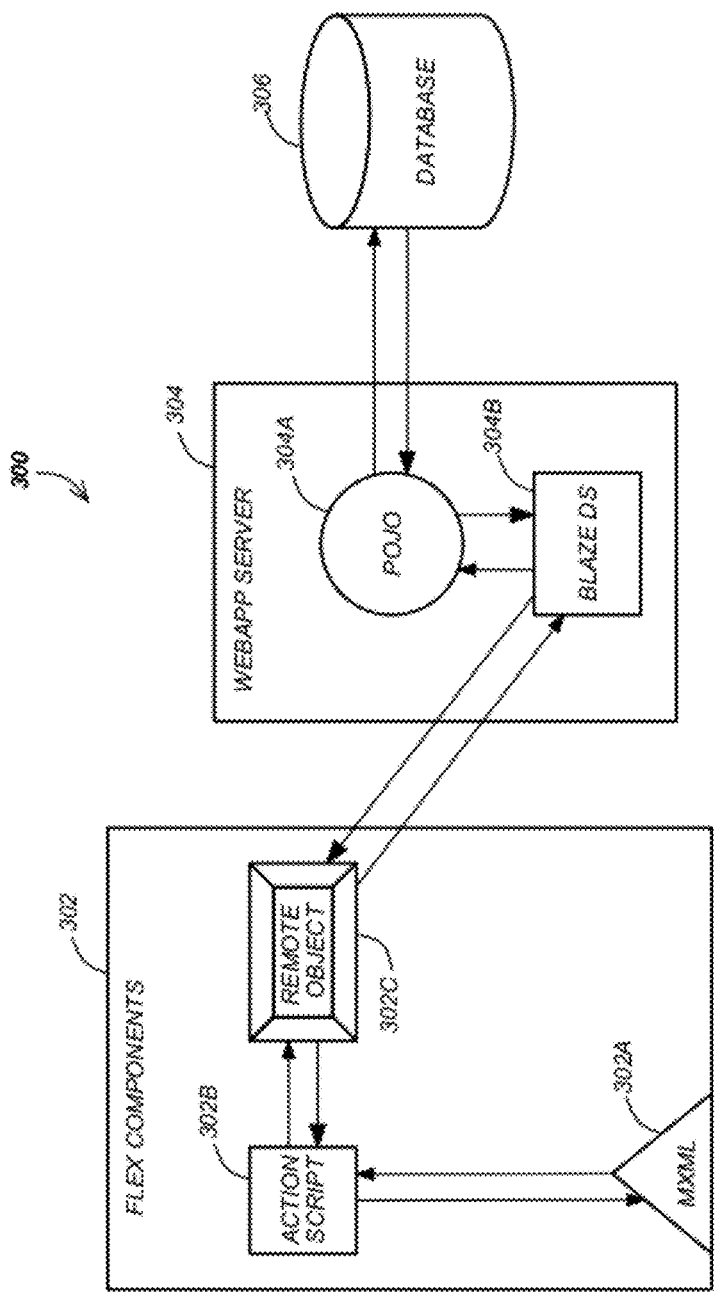
FIG. 3 illustrates the architecture of a hierarchy manager in accordance with one or more embodiments of the invention.

FIG. 3 illustrates the architecture of the hierarchy manager in accordance with one or more embodiments of the invention. Essentially, the hierarchy manager 300 consists of three primary components: user interface 302, business tier 304, and the MDM hierarchy database 306. A brief summary of each component 302-306 is described followed by details of each component 302-306.

The user interface 302 may be coded using Adobe™ Flex™ components (e.g., Adobe™ Flex™ 3 [MXML 302A and ActionScript™ 3.0 302B]). A thin business delegate layer 302B (and supporting data transfer [or value] remote objects 302C) serves to separate the business tier logic 304 from the remainder of the presentation logic. This business delegate may be written in ActionScript™ 302B. Thus, the business delegate layer 302B separates the presentation logic 302A from the business logic 304 in the web application server.

The business tier 304 resides on a web server and consists of POJOs (Plain Old Java Objects) 304A that handle the majority of the business tier processing.

The MDM hierarchy database 306 is a new database that holds various metadata tables. The tables hold metadata about hierarchies. This includes information about the dimensions, hierarchies, hierarchy objects, and hierarchy relationships.

The user interface component 302 is designed in a rich interface application (RIA) (e.g., via MXML 302A and ActionScript 320B) which in turn utilizes remote objects 302C to call a Java™ servlet deployed in the web application server 304 (e.g., via BlazeDS™). BlazeDS™ 304B is a server-based Java™ remoting and web messaging technology (available from Adobe™) that enables developers to easily connect to back-end distributed data and push data in real-time to Flex™ applications (i.e., in user interface 302) for more responsive rich internet application (RIA) experiences.

To support hierarchy versioning, the user interface 302 may include various Flex™ based screens for capturing versioning metadata and triggering the versioning process. Versioned hierarchy may be treated similar to a normal hierarchy and should maintain the common look and feel. Users may be able to indicate whether the version is editable or non-editable, at the time of creation. Users may also be able to launch the version viewer from a hierarchy manager and may also be able to jump directly to the viewer. Once launched, if a version is editable, embodiments of the invention may allow the user to perform operations like drag/drop and cut/paste to modify the hierarchy.

As described above, embodiments of the invention provide an extension to the existing hierarchy management feature within MDM. For creation of the new version staging area, a new "version" service may be added that represents the new version tables. The schema generation and incremental schema generation process may be enhanced to account for the new staging area. Various components and viewing systems may be modified to depict such a new staging area and capture related details. Additional metadata tables may also be defined to capture the hierarchy version metadata. Again, as described above, Flex™ technology may be used to represent the rich user interface for management of hierarchies. The Java™ based APIs (application programming interfaces) may also be enriched to handle the versioning related objects and data for the business tier 304. New user interface panels and controls may also be defined for the creation of a version and viewing the version. In addition, stored procedures may be used for all data replication tasks to leverage the database 306 capabilities.

Additional details and example implementations of the user interface 302 are described below.

The business tier component 304 may be configured to support various high-level business tier functions for both hierarchies and the hierarchy version viewer. In this regard, various Java™ APIs may be enriched to handle the versioning related objects and data for the business tier 304. With respect to hierarchies, the business tier 304 may provide the ability to get a hierarchy version for a hierarchy (i.e., returning a list of versions). In addition, a hierarchy version may be created by adding an entry to a hierarchy version table, a version metadata table, and by replicating the master data from MDM tables to version tables for all entities in the hierarchy.

To provide support for the hierarchy version viewer, the business tier 304 may perform search operations before and after launching a version viewer. Additionally, version data may be modified by various means (e.g., drag and drop, cut and paste, etc.). Lastly, on the click of a node, an internal or internal URL (uniform resource locator) may be launched that can provide additional details of the node.

Details of Exemplary Implementation

MDM Database 306

FIG. 2 above illustrates the general architecture for the tables within the MDM master database 306, which contain the member data of the relational objects, as well as the relationships to other relational objects. The hierarchy manager of the invention may always read and write through the primitive views that exist in the hierarchy database. However, the manager may not read/write directly to the master database 306. Nonetheless, since the database contains the master data, details of the enhancements to the various tables are described herein (for completeness). As described above, to visualize a version of a hierarchy, each master table (from a standard hierarchy) will have a corresponding version table. The data model of FIG. 2 illustrates the database enhancements in order to provide versioning related metadata tables in accordance with one or more embodiments of the invention.

A dimension table 218 defines a dimension. Fields within the table include a unique identifier (e.g., an integer) of the dimension, a name of the dimension, and a description of the dimension.

The hierarchy table 220 defines a hierarchy that belongs to a specific dimension (from dimension table 218). The hierarchy table 220 includes a HierarchyID, a name of the hierarchy, a description of the hierarchy, a version number for the hierarchy, a dimension ID for the dimension to which the hierarchy belongs, the name of the user creating the hierarchy, and a timestamp of the create date. The key to the hierarchy table 220 is the combination of the hierarchy ID and the version number.

The hierarchy version table 224 contains information about each version of the hierarchy (from hierarchy table 220) including an ID (of the hierarchy), a version number, a name of the user that explicitly created the hierarchy version, a description of the version, a date the hierarchy becomes effective, a placeholder column for the status of the hierarchy version, and the date the user created this version of the hierarchy. Further information regarding the version information may be stored in table 226 and details regarding the version information of table 226 may be stored in version information details table 228.

A hierarchy relational object model (ROM) table 222 that defines a relation between hierarchy 220 are relational object entities (tables 202-208). One hierarchy 220 can have one or more than one relation. The hierarchy ROM table 22 includes a unique identifier (e.g., integer) of the hierarchy 220 and an ID of the relational object map 208.

A relational object (from the hierarchy database) and a corresponding version relational object table 206 support the ability to use a hierarchy object in multiple hierarchies. To view a portion of the information in table 206, a version relational object filter may specify filtering information in table 214. Similarly, hierarchy information for the level of the relational object (for table 206 and the hierarchy version table 220) may be specified in table 216. Table 206 may include the following:

a unique identifier of the relational object;
a logical name of the table present in the database;
a physical name of the table present in the MDM database;
a name of the relational object;
a description of the relational object;
a view name for which relational object is created (null if a physical name exists);
a name of the column of the table that is to be displayed in the hierarchy viewer;
a URL address of a website launched when a user clicks on the node (the website can be internal or external);
a parameter of the URL that needs to be appended;
column names by which data is to be sorted;
logical column name that is to be displayed;
logical names of columns by which data is to be sorted;
logical name of columns that are displayed when a user hovers around the node;
a display name for versioning;
a sort column in the version table by which data is to be sorted;
a URL address of a versioned node that is launched when the node is clicked on;
a version physical name;
a name of the view that is used for versioning (null when a physical name is specified);
a logical name of a version table; and
a logical column name that is displayed when a node is hovered.

A relational object map (from a hierarchy database) and a corresponding version relational object map table 208 contain relational object relationships. Various relational object properties/version relational object properties and relational object data/version relational object data for the relational object map may be specified in tables 210 and 212 respectively. Fields/columns for the relational object map table 208 may include:

a unique identifier (integer) of the relational object map;
the name of the relationship, i.e. "Families to Segments";
the name of relationship which two relational objects are mapped;
a unique identifier of the relational object that is present as the parent in the relation;
a unique identifier of the relational object that is present as the child in the relation;
a unique identifier of the relational object key type table 202, that defines the type of key for the parent RO (a description of the version relational object key may also be specified in a separate table 204);

a unique identifier of the relational object key type table 202, that defines the type of key for the child RO;

a unique identifier of the relational object (e.g., the version relational object data table 212) for the relation's target (i.e., where the relational data persists);

physical names of columns that are involved in the mapping of relations from the parent RO table;

physical names of columns that are involved in the mapping of relations from the child RO table;

a description of the relation;

logical names of columns that are involved in the mapping for relations from the parent RO table; and logical names of columns that are involved in the mapping for relations from the child RO table.

For versioned tables (i.e., all of the tables of FIG. 2), an additional column/field may be added to indicate the version ID. All other columns may remain the same from the hierarchy tables in the MDM database. Further, stored procedures may be used for all data replication tasks to leverage the database capabilities.

Framework Related Enhancements

For creation of the new version staging area, a new "Version" service may be added that represents the new version tables (i.e., of FIG. 2). As described above, MDM provides the process and framework for maintaining a series of business rules and process workflows that manage business critical data as it feeds in from multiple sources. Developers may need to design the schema for the database where the master data is stored. Prior art implementations provided a schema generation and incremental schema generation process to provide such design capabilities. To account for the addition of the new version service and version staging area, the schema generation and incremental schema generation processes may be enhanced. Further, prior art management and design tools (e.g., Studio™) may be modified to depict the new staging area and to capture related details.

User Interface Enhancements for Versioning

As described above, it is desirable for customers in a MDM context to have the ability to search for a certain entity, view it in the hierarchy, and then launch a maintenance workflow for that record. Referring again to FIG. 3, the Adobe™ Flex™ technology (e.g., Adobe Flex 3™) within UI component 302 provides a capability to represent and view an entity using a hierarchy Flex™ UI. In addition, hierarchy versioning may utilize new Flex™ based screens for capturing versioning metadata and triggering the versioning process. A versioned hierarchy is treated similar to a normal hierarchy and maintains the common look and feel as that of prior art hierarchies in a hierarchy viewer.

Figure 4:
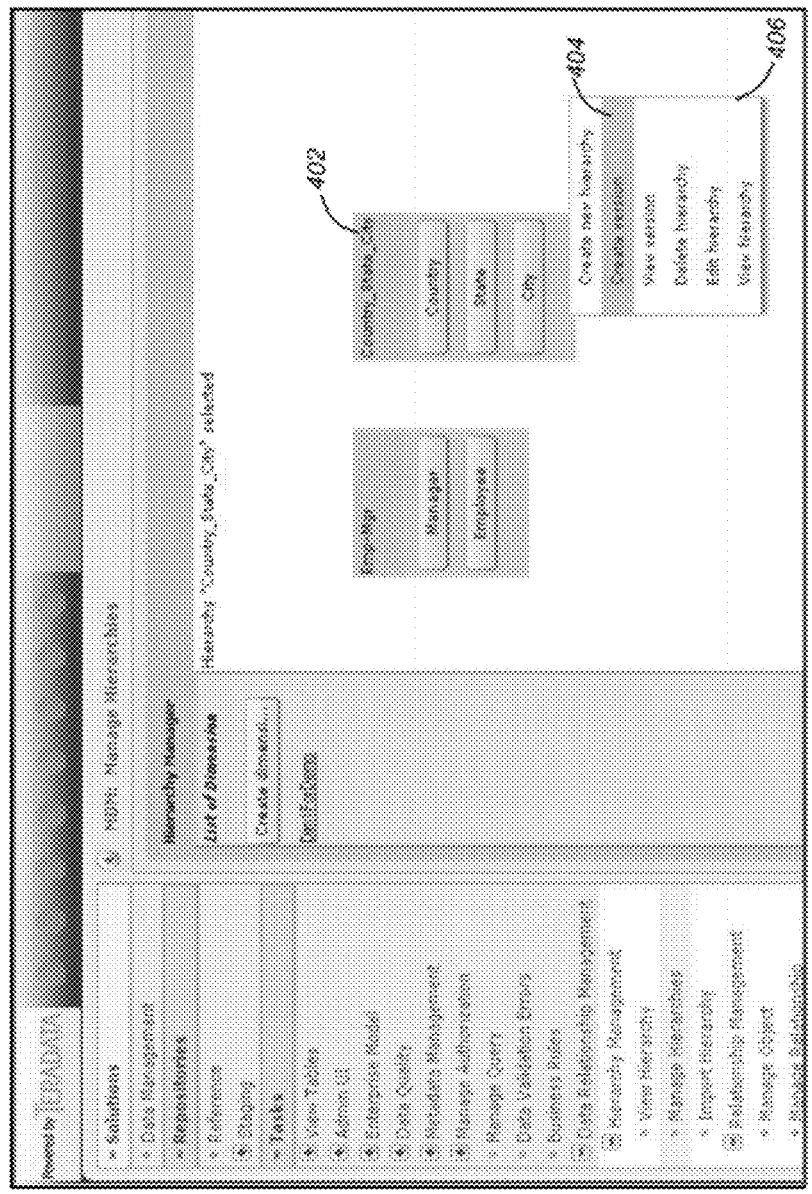
FIG. 4 is an exemplary user interface illustrating the selection of a menu option to create a new hierarchy version in accordance with one or more embodiments of the invention.

To create a hierarchy version, a user simply selects a menu option to create a version based on a currently selected hierarchy (that the version will correspond with). FIG. 4 is an exemplary user interface illustrating the selection of a menu option to create a new hierarchy version in accordance with one or more embodiments of the invention. As illustrated, the user selects a particular hierarchy (e.g., hierarchy "Country_State_City" 402), activates a menu command (e.g., via a keyboard control, right mouse click, etc.) and selects the "Create version" option 404 from menu 406.

Figure 5:
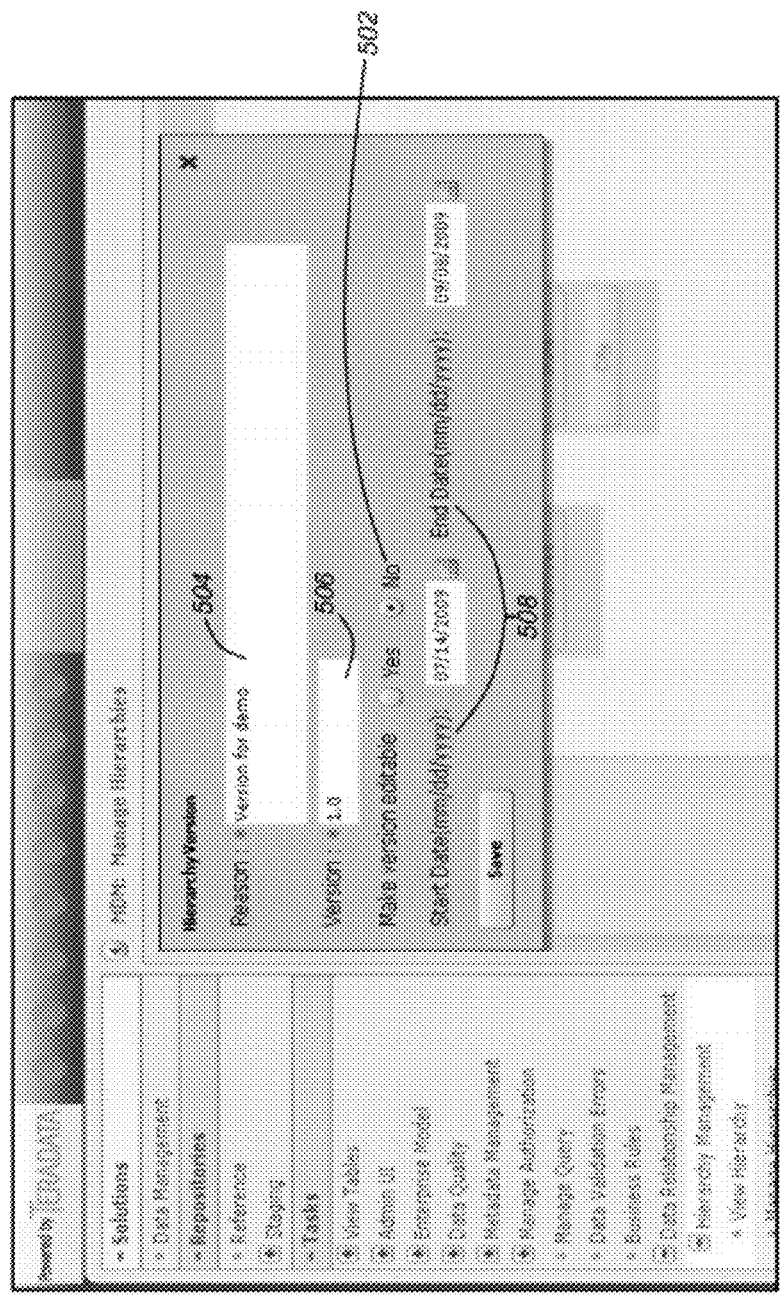
FIG. 5 is an exemplary user interface illustrating the options for configuring a hierarchy version in accordance with one or more embodiments of the invention.

In response to the activation of menu option 404, the user may be presented with additional options for the hierarchy version. FIG. 5 is an exemplary user interface illustrating the options for configuring a hierarchy version in accordance with one or more embodiments of the invention. As illustrated, users can indicate whether the version is editable or non-editable 502, at the time of creation. Making a hierarchy non-editable would imply that editing or "drag and drop" would not be allowed on this particular hierarchy version. Additional hierarchy version metadata may be specified including the reason for creating the hierarchy version 504, the version number 506, and the start and end dates 508.

Figure 6:
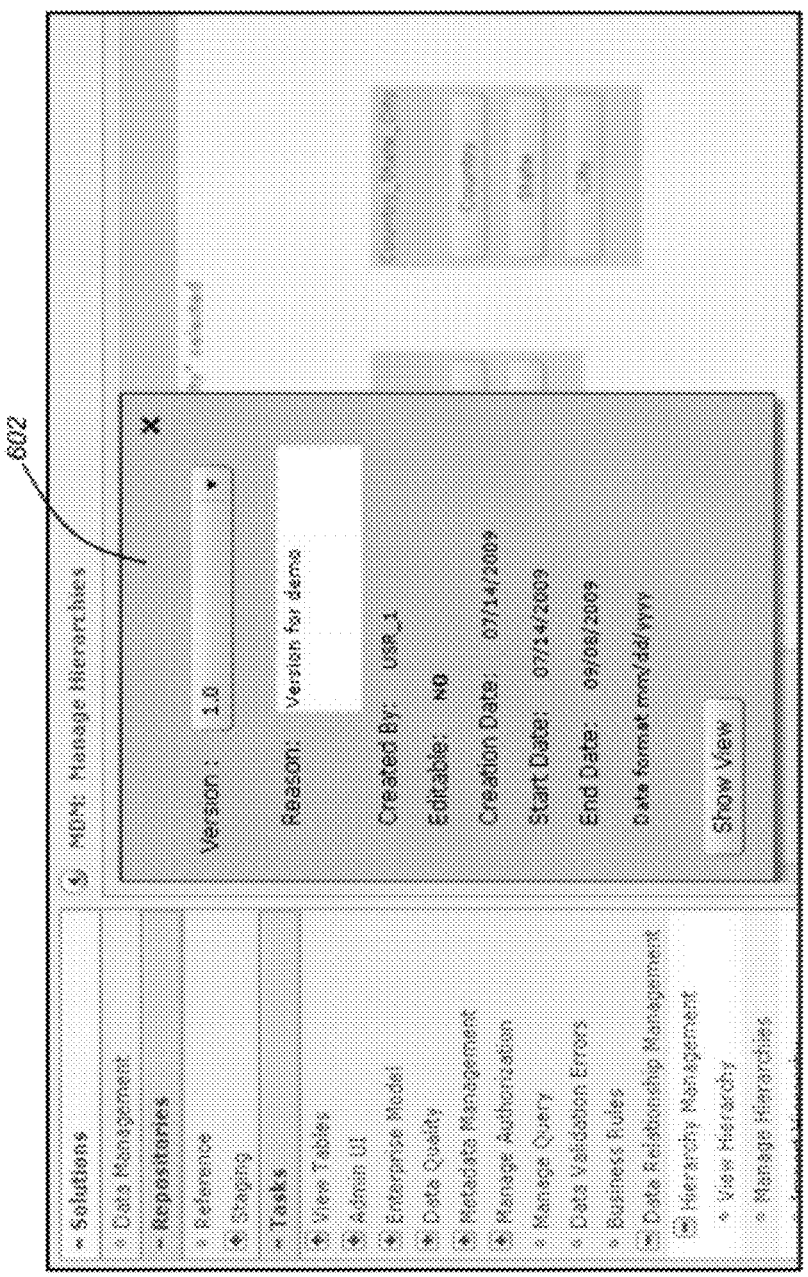
FIG. 6 is a user interface illustrating a view of a hierarchy version using a hierarchy viewer in accordance with one or more embodiments of the invention.

To view a hierarchy, the user can launch a version viewer from within the hierarchy manager and can also jump directly to the viewer. Once launched, if the version is editable, it would allow the user to perform operations like Drag/Drop and Cut/Paste to modify the hierarchy. Further, the hierarchy viewer enables the user to view additional details of the hierarchy version including the creator and effective dates (e.g., specified in the user interface of FIG. 5). FIG. 6 is a user interface illustrating a view of a hierarchy version using a hierarchy viewer in accordance with one or more embodiments of the invention. As illustrated, the version, reason, user, and relevant dates are displayed in the viewer 602.

Logical Flow

Figure 7:
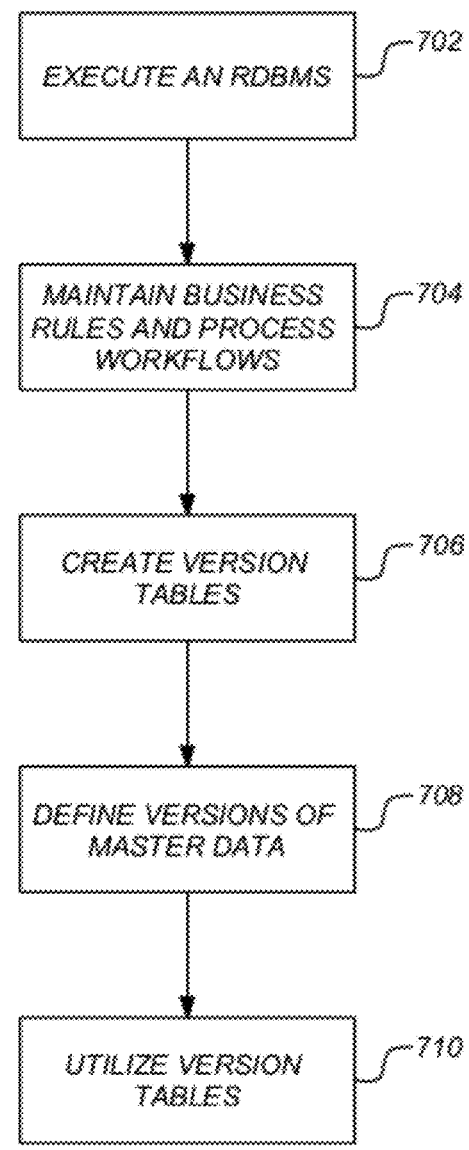
FIG. 7 is a flow chart illustrating the logical flow for maintaining versions of structured views of data in a computer system in accordance with one or more embodiments of the invention.

FIG. 7 is a flow chart illustrating the logical flow for maintaining versions of structured views of data in a computer system in accordance with one or more embodiments of the invention.

At step 702, a relational database management system (RDBMS) is executed. The RDBMS stores master data in the computer system in one or more master RDBMS tables. Further, the master data is hierarchical in nature and hierarchy metadata for the master data is also stored in the RDBMS tables.

At step 704, as part of a process and framework, a series of business rules and process workflows to manage the master data are maintained.

At step 706, one or more version tables are created in the RDBMS that correspond to each of the one or more master RDBMS tables. Each of the version tables further includes an attribute denoting version information (to tie together the different versions and also establish a primary key in/for each version). Further, the version tables may utilize a partitioning concept to optimize a retrieval and deletion of version data.

At step 708, one or more versions of the master data are defined by replicating (e.g., in a version staging area) the master data and hierarchy metadata stored in the master RDBMS tables into the corresponding version tables.

At step 710, the version tables are used to graphically visualize, manage, and manipulate the one or more versions of the master data. Thus, a version of the master data may be edited using the hierarchy data stored in the version tables (e.g., using a hierarchy viewer that displays a hierarchical representation of the different versions.

CONCLUSION

This concludes the description of the preferred embodiment of the invention. The following paragraphs describe some alternative embodiments for accomplishing the same invention. In one alternative embodiment, any type of computer or configuration of computers could be used to implement the present invention. In addition, any database management system, decision support system, on-line analytic processing system, or other computer program that performs similar functions could be used with the present invention.

In view of the above, embodiments of the invention support different versions of master data that can be used to historical or time dependent analysis and that can be accessed in the same way as other hierarchies. Further, such versioning is supported as part of and integrated into the master data management context.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for maintaining versions of structured views of data in a computer system, comprising:
   (a) executing a relational database management system (RDBMS) that stores information in the computer system, wherein:
   (i) the RDBMS is part of a centralized framework that is configured to manage, view, and control access to the information;
   (ii) one or more business rules and one or more workflow data processes manage the information from multiple sources;
   (iii) the one or more business rules and the one or more workflow data processes are applied to the information from multiple sources, to consolidate the information and produce master data;
   (iv) the master data is stored in a central business database of the RDBMS in one or more master RDBMS tables;
   (v) the master data is fed to one or more consuming business processes;
   (vi) access to the master data is limited to one or more workflow data processes of the framework;
   (b) creating, within the framework, one or more version tables in the RDBMS that correspond to each of the one or more master RDBMS tables, wherein each of the one or more version tables further comprises an attribute denoting version information, and wherein the attribute denoting version information forms a part of a primary key in each of the one or more version tables;
   (c) defining one or more versions of the master data by replicating the master data and hierarchy metadata stored in the master RDBMS tables into the corresponding one or more version tables; and
   (d) utilizing, within the framework, the one or more version tables to graphically visualize, manage, and manipulate the one or more versions of the master data in a hierarchical manner.

2. The method of claim 1, wherein the replicating of the master data is performed in a version staging area.

3. The method of claim 1, wherein the one or more version tables utilize a partitioning concept to optimize a retrieval and deletion of version data.

4. The method of claim 1, further comprising editing one of the one or more versions of the master data using the hierarchy metadata stored in the one or more version tables.

5. An apparatus for maintaining versions of structured views of information in a computer system, comprising:
   (a) a processor;
   (b) a relational database management system (RDBMS) executed by the processor of the computer system, wherein:
   (i) the RDBMS is part of a centralized framework that is configured to manage, view, and control access to the information;
   (ii) one or more business rules and one or more workflow data processes manage the information from multiple sources;
   (iii) the one or more business rules and the one or more workflow data processes are applied to the information from multiple sources, to consolidate the information and produce master data;
   (iv) the master data is stored in a central business database of the RDBMS in one or more RDBMS tables;
   (v) the master data is fed to one or more consuming business processes;
   (vi) access to the master data is limited to one or more workflow data processes of the framework;
   (c) a master data management system, executed by the processor of the computer system, and configured to maintain, as part of the framework, the one or more business rules and the one or more workflow data processes to manage the master data that resides in the one or more tables in the RDBMS, wherein:
   (i) the master data is hierarchical in nature;
   (ii) hierarchy metadata for the master data is stored in the RDBMS tables;
   (iii) the master data management system creates one or more version tables in the RDBMS that correspond to each of the one or more master RDBMS tables, wherein each of the one or more version tables further comprises an attribute denoting version information, and wherein the attribute denoting version information forms a part of a primary key in each of the one or more version tables; and
   (iv) the master data management system defines one or more versions of the master data by replicating the master data and hierarchy metadata stored in the master RDBMS tables into the corresponding one or more version tables; and
   (d) a hierarchy viewer configured to utilize the one or more version tables to graphically visualize, manage, and manipulate the one or more versions of the master data in a hierarchical manner.

6. The apparatus of claim 5, wherein the replicating of the master data is performed in a version staging area.

7. The apparatus of claim 5, wherein the one or more version tables utilize a partitioning concept to optimize a retrieval and deletion of version data.

8. The apparatus of claim 5, further comprising editing one of the one or more versions of the master data using the hierarchy metadata stored in the one or more version tables.

9. An article of manufacture comprising a tangible non-transitory program storage device readable by a computer, tangibly embodying at least one program of instructions executable by the computer to perform method steps of maintaining versions of structured views of information in a computer system, the method steps comprising:
   (a) executing a relational database management system (RDBMS) that stores the information in the computer system, wherein:
   (i) the RDBMS is part of a centralized framework that is configured to manage, view, and control access to the data;
   (ii) one or more business rules and one or more workflow data processes manage the information from multiple sources;
   (iii) the one or more business rules and the one or more workflow data processes are applied to the information from multiple sources, to consolidate the information and produce master data;
   (iv) the master data is stored in a central business database of the RDBMS in one or more master RDBMS tables;
   (v) the master data is fed to one or more consuming business processes;

- (vi) access to the master data is limited to one or more workflow data processes of the framework;
- (vii) the master data is hierarchical in nature; and
- (vi) hierarchy metadata for the master data is stored in the RDBMS tables;
- (b) creating one or more version tables in the RDBMS that correspond to each of the one or more master RDBMS tables, wherein each of the one or more version tables further comprises an attribute denoting version information, and wherein the attribute denoting version information forms a part of a primary key in each of the one or more version tables;
- (c) defining one or more versions of the master data by replicating the master data and hierarchy metadata stored in the master RDBMS tables into the corresponding one or more version tables; and
- (d) utilizing the one or more version tables to graphically visualize, manage, and manipulate the one or more versions of the master data in a hierarchical manner.

10. The article of manufacture of claim 9, wherein the replicating of the master data is performed in a version staging area.

11. The article of manufacture of claim 9, wherein the one or more version tables utilize a partitioning concept to optimize a retrieval and deletion of version data.

12. The article of manufacture of claim 9, further comprising editing one of the one or more versions of the master data using the hierarchy metadata stored in the one or more version tables.

* * * * *